M. W. GRIGSBY.
VEHICLE WHEEL RIM.
APPLICATION FILED MAY 18, 1918.
1,391,472. Patented Sept. 20, 1921.
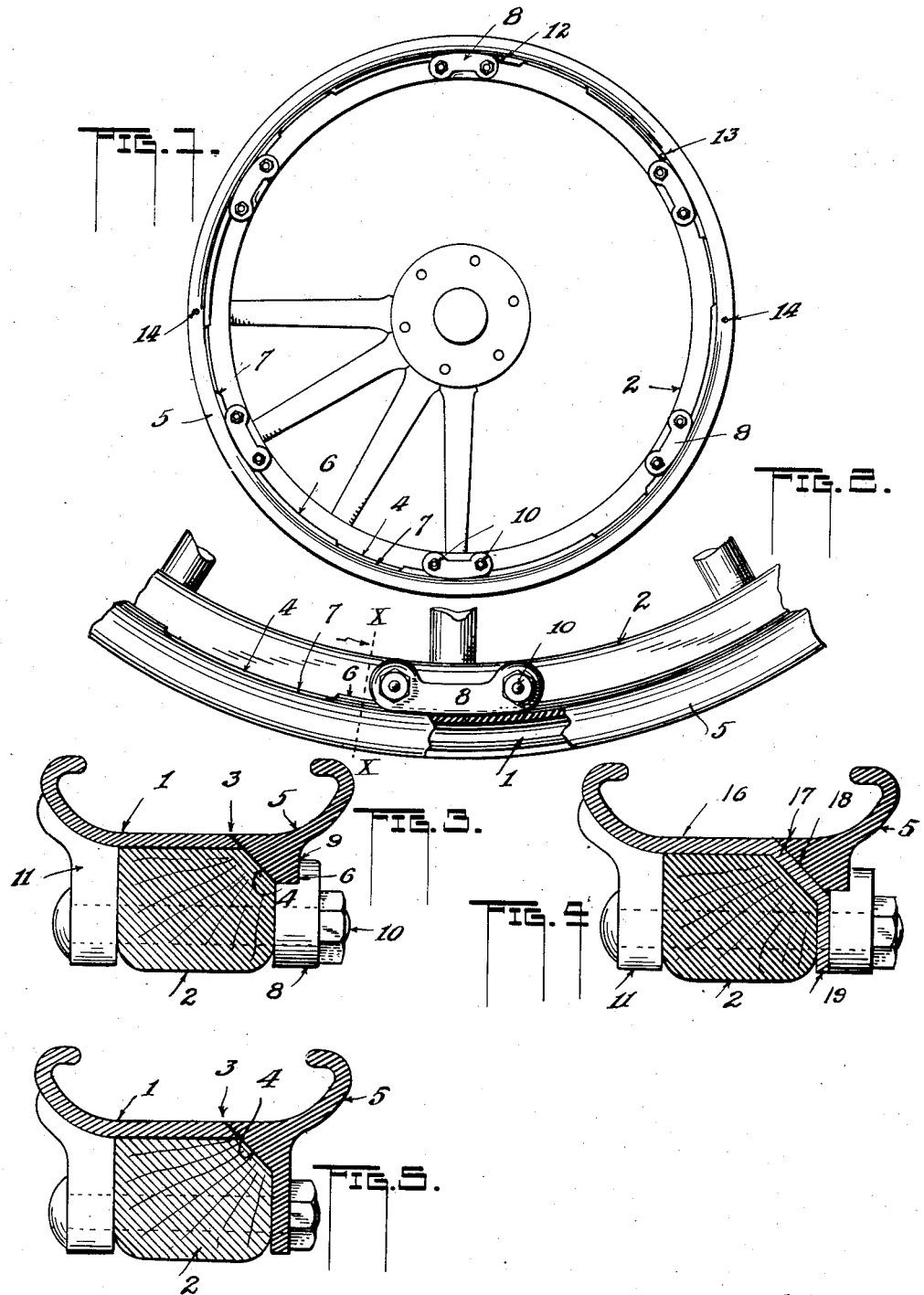

UNITED STATES PATENT OFFICE.

MARION WILLIAM GRIGSBY, OF EAST PEORIA, ILLINOIS.

VEHICLE-WHEEL RIM.

1,391,472.  Specification of Letters Patent.  Patented Sept. 20, 1921.

Application filed May 18, 1918. Serial No. 235,371.

*To all whom it may concern:*

Be it known that I, MARION WILLIAM GRIGSBY, citizen of the United States, residing at East Peoria, in the county of Tazewell and State of Illinois, have invented certain new and useful Improvements in Vehicle-Wheel Rims; and I do hereby declare that the following is a full, clear, and exact description of the invention, which will enable others skilled in the art to which it appertains to make and use the same.

This invention relates to improvements in vehicle wheels and particularly to vehicle wheel rims, being especially applicable to automobile wheels using pneumatic tires of clencher and analogous types.

At the present time a large proportion of automobile wheels, owing to the necessity for economy, are fitted with one piece non-demountable clencher rims and an owner of a car in order to secure the advanage of a rim of the demountable or detachable type must provide a new set of wheels furnished with the well known forms. This change, of course, means the loss of the original wheels and it is my purpose to produce a construction wherein such original wheels and their rims may be readily changed at small expense, also that all wheels at the time of their manufacture may be furnished with the detachable feature at but little added cost.

One of the objects of my invention, therefore, is to provide for converting the wheel rims of the one piece non-demountable type into rims having the advantages of the demountable type.

Another object is to provide a construction in which the original rim upon a wheel may be used, thus saving the greater part of the investment in the rim and the wheel, merely adding a few minor parts.

Another object is to provide a detachable type of rim of a simple form, the use of which will result in the least possible time required in making repairs or changes to tires.

Still another object is to provide a simple form of rim split circumferentially thereby permitting the application of a shoe or casing and its inner tube without injury to the latter which is quite often the case when using tire tools for removing or applying said casing.

A still further object is that of providing a peculiar type of rim and wheel which will admit of a solid, semi-solid, or non-pneumatic tire being applied to the wheel without the use of tools.

Another object is to provide a detachable rim section which can be quickly applied to or removed from the wheel by rotating it slightly with respect to the wheel after being applied to the latter to carry it to its locking position.

Other objects and advantages will appear in the following specification, aided by the accompanying drawings, forming a part of this application, wherein, Figure 1 is an elevation of a wheel showing one form of my invention;

Fig. 2 shows a portion of a wheel felly and a part of the removable rim section shown in Fig. 1, the whole being on a much larger scale than shown in said figure;

Fig. 3 is a cross section of the felly and rim on line $x$—$x$, Fig. 2, much enlarged; and Figs. 4 and 5 are cross sections of modified forms of the same.

In Figs. 1, 2, 3 and 5 the metal rim is represented at 1, being mounted upon the felly 2. If a clencher rim is reconstructed it is severed circumferentially along the line 3, said line of separation being inward from one edge of the felly as shown, the rim and felly being beveled downwardly and outwardly as at 4 terminating at a point along the side face of the felly.

In Fig. 3, 5 indicates a removable rim section which corresponds in form with the rim 1, one of whose edges is beveled to correspond with and for lying upon the described bevel 4. This said rim section 5 is a complete ring and is furnished with an inwardly extending flange 6, provided with regularly spaced recesses 7.

8 indicates a series of plates each having a recess 9, Fig. 3. These plates lie against the felly and receive the described flange 6 in the recesses thereof. That is to say, the plates overlie the flange 6 as clearly shown. 10, 10 indicate pairs of bolts extending through the plates and the felly, also through holding members 11 at the opposite side of the felly, the said holding members and said plates serving, in conjunction, to prevent separation of the rim 1 and rim section 5 when the tire is inflated.

In the present instance, I have shown six of the plates 8, which with the corresponding members 11 are equally spaced around the wheel so that said plates and the recesses 7 of the flange 6 correspond in position.

In Fig. 1 the removable rim part 5 is in position upon the felly, the flange 6 lying behind the plates 8. In the flange 6 of the said rim part section 5 are two pins 12, 13, which lie between two of the plates 8, each being close to one of the said plates.

In order to remove the rim part section 5 the uppermost plate 8, Fig. 1, is removed by removing the nuts from the bolts 10 whereupon the rim section may be turned to the left so that the recesses 7 can be brought into register with said plates whereupon the rim section can be taken off since the pin 12 is then free to travel to the left as will be clearly understood. Any method of turning the rim section about the axis of the wheel may be used, but I preferably provide holes 14 therein which may be engaged by any suitable tool for the purpose.

In replacing the rim section the same operation is gone through in a reverse order. Clearly, these pins, in use, prevent the rim section rotating to permit the recesses and plates to come into register.

In the modification shown in Fig. 5, the removable rim section has a flange 16 which extends inwardly along the side of the felly and through which flange suitable fastening bolts are adapted to project.

In Fig. 4 a slightly different form of the invention is illustrated. The rim in this figure is drawn inwardly at 17 to produce a beveled portion 18 corresponding to the bevel 4 in Figs. 3 and 5, the metal being then formed as at 19 to lie against the side of the felly.

The removable rim section in Fig. 4, corresponds in form to that in Fig. 3. Likewise the plate and holding member 11 correspond to those in the other figures.

A very important object of my invention is that a tire or shoe can be very readily slipped into place upon the wheel rim without requiring tools for that work.

The circumference of the base of bead portion of a pneumatic tire is much less, measured upon the surface that lies upon the rim, than the circumference of the rim itself. Consequently, when used with even a type of rim such as I describe herein tools would be required to stretch the tire over the rim.

By providing a bevel such as shown in the several figures the tire may be readily forced to position since the bevel serves to cause the tire to spread under pressure so as to slip to its place upon the rim. This has been found to be a very important feature since, as stated, no tools are necessary and no time is lost in placing the tire in position and there is no danger of puncturing or injuring in any way the air tube therein.

Furthermore, after this easy manner of placing the tire in position the simple rotation of the removable rim section concludes the work except replacing of the plates 8.

It is noted that in all of the forms shown the beveled feature is present, either the rim and felly are beveled, or the rim itself, all of which provide for the described easy replacement of the tire.

My invention provides for the reconstruction of clencher rims, as described, as well as in the construction of new rims so that the invention is universal in its adaptation.

It is not my purpose to be confined to what is shown and described since changes may be made that will lie within the meaning of the invention and fall within the scope of the appended claims.

Having thus described my invention, I claim:—

1. The combination with a wheel felly, of a two-part rim of which one part has a tire engaging flange, and also a portion extending partly across the outer surface of the felly as a felly band and terminating in a contact face, said contact face and felly edge being beveled and providing a first broad inclined surface extending from an intermediate point in the side face of the felly to the peripheral face of said felly band, the other rim part having a second tire engaging flange and a second inward beveled surface complementary to said first broad inclined surface, and means for removably securing said second rim part in position.

2. A vehicle wheel having a felly and two-part rim, one part of said rim having a tire engaging flange and also a portion extending at least partly across the peripheral face of the felly as a felly band, said wheel having a broad inclined surface beveled with respect to the side face of said felly and the peripheral face of said felly band and extending from an intermediate point along the side face of said felly to the peripheral face of said felly band, the other rim part having a second tire engaging flange and an inward beveled surface complementary to said broad inclined surface, and means for removably securing said second rim part in position.

3. The combination with a wheel felly, of a two-part rim of which one part has a tire engaging flange, and also a portion extending at least partly across the outer surface of the felly and terminating in a contact face, said contact face and felly edge being beveled, the other rim part having a second tire engaging flange and an inward beveled surface complementary to said rim contact face and felly beveled surface, a set of devices spaced apart and carried by the felly for removably clamping said second rim part, there being a set of recesses in the edge of said second part adapted to be brought opposite said devices upon rotating the second part whereby the latter may be removed.

In testimony whereof I affix my signature, in presence of two witnesses.

MARION WILLIAM GRIGSBY.

Witnesses:
   Roscoe Herget,
   L. M. Thurlow.